No. 615,603. Patented Dec. 6, 1898.
N. ALBREEKT.
COMBINED PLANTER, CHOPPER, AND CULTIVATOR.
(Application filed Oct. 14, 1897.)
(No Model.)
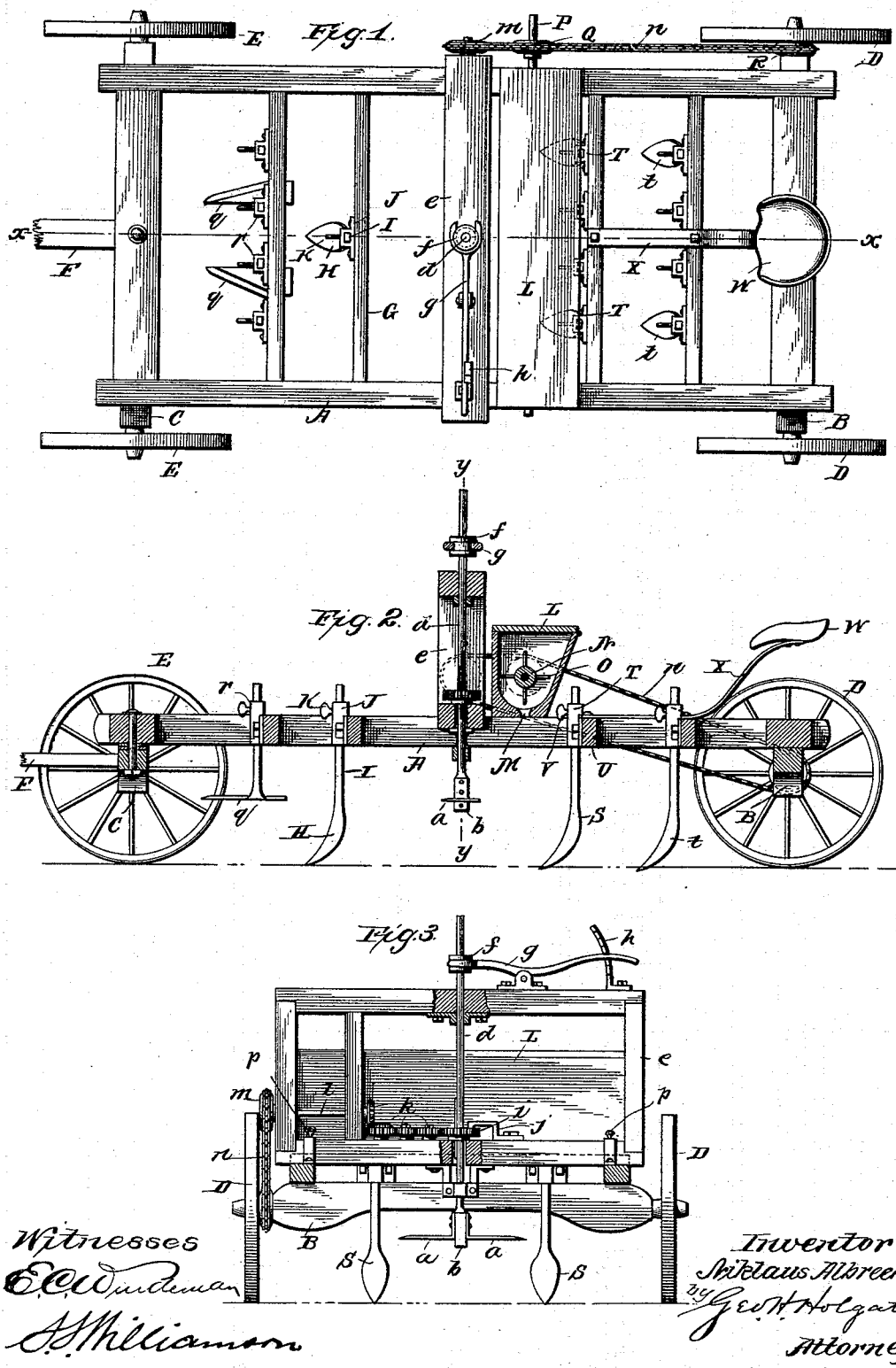

UNITED STATES PATENT OFFICE.

NIKLAUS ALBREEKT, OF SOWERS, TEXAS.

COMBINED PLANTER, CHOPPER, AND CULTIVATOR.

SPECIFICATION forming part of Letters Patent No. 615,603, dated December 6, 1898.

Application filed October 14, 1897. Serial No. 655,240. (No model.)

*To all whom it may concern:*

Be it known that I, NIKLAUS ALBREEKT, a citizen of the United States, residing at Sowers, in the county of Dallas and State of Texas, have invented a certain new and useful Improvement in a Combined Planter, Chopper, and Cultivator, of which the following is a specification.

My invention relates to a new and useful improvement in combined cotton planters, choppers, and cultivators, and has for its object to provide a simple, durable, and effective apparatus of this description, which may be quickly converted from a planter to a chopper or cultivator and when so converted will perform either function with equal, if not greater, facility than apparatus which are constructed for but one of these operations.

With these ends in view this invention consists in the details of construction and combination of elements hereinafter set forth and then specifically designated by the claim.

In order that those skilled in the art to which this invention appertains may understand how to make and use the same, its construction and operation will now be described in detail, referring to the accompanying drawings, forming a part of this specification, in which—

Figure 1 is a plan view of a machine or apparatus built in accordance with my improvement; Fig. 2, a longitudinal section upon the line $x\ x$ of Fig. 1, and Fig. 3 a cross-section upon the line $y\ y$ of Fig. 2.

In carrying out my invention as here embodied I provide a rectangular frame A, which is mounted upon the axles B and C, the former being rigid therewith, while the latter is pivoted thereto after the usual manner of vehicle-axles, and upon these axles are journaled the wheels D and E. A suitable tongue F is secured to the front axle in any convenient manner, by means of which a team may be attached to the machine, or, if preferred, a thill may be connected with this axle.

A cross-bar G, forming a part of the frame or body of the machine, has adjustably attached thereto the plow or opening-blade H, with which is formed the shank I, the latter passing through a suitable housing or clip J and adapted to be secured in any adjustment by means of the set-screw or bolt K. When the machine is to be used as a planter, this opener is adjusted to the proper depth to form the furrow into which the seed are to be dropped, and therefore it is preferable that this opener be placed upon a central longitudinal line of the machine.

L is a hopper placed upon the frame of the machine and adapted to hold the seed to be deposited, and through the bottom of this hopper is an opening M for the dropping of the seed, and, if desired, a spout or chute may lead downward from this opening to the ground in order that the seed may be conveyed to the exact point desired.

An agitator N is journaled within the hopper and has projecting therefrom the fingers O, so that when the machine is in operation, this agitator, being revolved, as hereinafter set forth, will cause the seed to be more evenly fed from the opening M and prevent the clogging thereof. The shaft of the agitator is extended, as indicated at P, and has splined thereon a sprocket-wheel Q, to which rotation is imparted from one of the wheels D by means of a sprocket-wheel R, secured upon said wheel, and a chain running over these two sprocket-wheels, as will be readily understood.

After the seed have been dropped within the furrow formed by the opener H it is necessary that the soil be thrown thereover in order that the furrow may be closed, and this I accomplish by providing the closing-blades S, which are adjustably set in the housings T, secured upon the cross-bar U, and these closers may be adjusted as to their height by the set-screws V. From this it will be seen that when the machine is used as a planter it is only necessary that it be drawn forward by a suitable team to open the furrow, deposit the seed therein, and close said furrow, thus accomplishing the complete operation of planting without care upon the part of the driver except to guide the team.

A seat W is mounted upon a suitable support X, secured to the frame or cross-bars thereof in order that the driver may be mounted upon the machine in easy access of the operating parts thereof, thus enabling him to observe the operations of the machine and detect at any time any difficulty which may arise with said operations.

In order that the machine may be adapted for the operations of chopping, which require the cutting out of the cotton-weeds, I provide a revolving cutter $a$, which is here shown as composed of two horizontal projecting blades, and these blades are secured by means of the hub $b$ to the spindle $d$, which latter is journaled in an upright frame $e$, said frame being supported upon the bed or frame of the machine in such manner that it may be adjusted crosswise thereof, for the purpose hereinafter set forth.

The vertical spindle $d$ is provided with a clutch-collar $f$ upon its upper end, and engaging with this collar is a bifurcated adjusting-lever $g$, the outer end of which is adapted to engage with the teeth of the segment $h$, by which means the shaft $d$ may be adjusted vertically, so as to bring the cutter $a$ into greater or less proximity to the ground over which the machine is passing. The vertical shaft has splined thereon the gear-wheel $i$, which latter is held in place against vertical displacement by the bracket $j$, so that when the shaft is adjusted this gear will not be affected thereby, but will continue to transmit rotation to said shaft when rotation is transmitted to it, and rotation is transmitted to this gear through the train of gears $k$, including suitable bevel-gears, one of which is secured upon the horizontal shaft $l$. The last-named shaft is journaled in suitable bearings in the upright frame, and projecting beyond said frame has secured thereon the sprocket-wheel $m$, over which passes the sprocket-chain $n$, connecting the rear wheel D with this shaft and also with the shaft P. By this arrangement when the machine is drawn forward the cutter $a$ will be rapidly revolved, and as it passes over the ground it will chop down the cotton-weeds in order that the cotton crop may be rendered more productive, as is well understood.

The upright frame may be held in any crosswise adjustment by the set-screws $p$, thus permitting the locating of the cutter relative to the line of travel of the machine, so as to either cut to one side or the other rows of cotton, as is found most advantageous in the operations of the machine.

To assist in the chopping of the cotton-weeds, the stationary blades $q$ are secured within the housings $r$, carried by a cross-bar of the machine-frame, and these blades may be adjusted by suitable set-screws in order that their relative position to the ground over which the machine passes may be varied, and these blades have angular edges thereon, which serve to sever the cotton-weeds by a shear cut, and such weeds as have not been so cut by these blades will be acted upon by the cutter $a$.

To utilize my improved machine as a cultivator, I provide plow-blades $t$, which are adjustably secured in suitable housings secured to a cross-bar of the machine-frame, and when these are used in conjunction with the closers S and the opener I it will be seen that the entire surface over which the machine passes will be acted upon and the soil properly agitated for the desired effect, and as any or all of these parts of the machine may be thrown into or out of active position by the means provided for their adjustment it is obvious that the machine may be quickly converted from a planter to a chopper or from a chopper to a cultivator.

Having thus fully described my invention, what I claim as new and useful is—

In a device of the character described, a horizontal frame, an upright frame adjustable transversely on the first-named frame, a bracket secured to the under side of the lower beam of the horizontal frame, said bracket having the central portion offset from said beam, a shaft journaled in said offset portion in the top beam of the vertical frame, cutter-blades having right-angular ends by means of which they are secured to the lower end of the shaft, a gear-wheel splined on said shaft, a train of gears mounted on the upright frame for transmitting motion to the gear-wheel, and means for adjusting said shaft vertically, as and for the purpose described.

In testimony whereof I have hereunto affixed my signature in the presence of two subscribing witnesses.

NIKLAUS ALBREEKT.

Witnesses:
S. S. WILLIAMSON,
F. MATTNER.